United States Patent
Harbaugh et al.

(10) Patent No.: US 10,121,224 B2
(45) Date of Patent: Nov. 6, 2018

(54) DEVICE AND METHOD OF MULTI-DIMENSIONAL FREQUENCY DOMAIN EXTRAPOLATION OF SENSOR DATA

(71) Applicant: Raytheon Company, Waltham, MA (US)

(72) Inventors: J. Kent Harbaugh, Burbank, CA (US); Michael W. Whitt, Redondo Beach, CA (US); Theagenis J. Abatzoglou, Huntington Beach, CA (US)

(73) Assignee: Raytheon Company, Waltham, MA (US)

( * ) Notice: Subject to any disclaimer, the term of this patent is extended or adjusted under 35 U.S.C. 154(b) by 280 days.

(21) Appl. No.: 15/222,002

(22) Filed: Jul. 28, 2016

(65) Prior Publication Data

US 2018/0033119 A1 Feb. 1, 2018

(51) Int. Cl.
*G06T 3/40* (2006.01)
*H04L 29/08* (2006.01)
(Continued)

(52) U.S. Cl.
CPC .............. *G06T 3/4007* (2013.01); *G01S 7/41* (2013.01); *G01S 13/00* (2013.01); *G01S 13/10* (2013.01); *H04L 67/12* (2013.01)

(58) Field of Classification Search
CPC ....... G06T 3/40; G06T 3/4007; G06T 3/4053; G06T 3/4076; G06T 3/4084; G06T 5/001; G01S 7/28; G01S 7/295; G01S 7/2955; G01S 7/41; G01H 3/04; G01H 3/08; G01H 17/00
See application file for complete search history.

(56) References Cited

U.S. PATENT DOCUMENTS 5,365,303 A 11/1994 Yamasaki et al.
5,646,623 A 7/1997 Walters et al.
(Continued)

FOREIGN PATENT DOCUMENTS

WO 2018044416 A3 3/2018
WO WO-2018044416 A2 3/2018

OTHER PUBLICATIONS

"International Application Serial No. PCT/US2017/042781, International Search Report dated Mar. 28, 2018", 2 pgs.
(Continued)

*Primary Examiner* — Andrew W Johns
(74) *Attorney, Agent, or Firm* — Schwegman Lundberg & Woessner, P.A.

(57) ABSTRACT

Embodiments of a device and a frequency data extrapolator are generally described herein. The frequency data extrapolator may receive input frequency data mapped to a two-dimensional frequency grid. As an example, the input frequency data may be based on return signals received, at a sensor of the device, in response to pulsed transmissions of the sensor in a physical environment. Regions of the frequency grid may be classified as high fidelity or low fidelity. A group of basis rectangles may be determined within the high fidelity regions. A column-wise extrapolation matrix and a row-wise extrapolation matrix may be determined based on the input frequency data of the basis rectangles. The input frequency data of the high fidelity regions may be extrapolated to replace the input frequency data of the low fidelity regions.

23 Claims, 9 Drawing Sheets

(51) Int. Cl.
*G01S 7/41* (2006.01)
*G01S 13/00* (2006.01)
*G01S 13/10* (2006.01)

(56) References Cited

U.S. PATENT DOCUMENTS

| | | |
|---|---|---|
| 5,686,922 A | 11/1997 | Stankwitz et al. |
| 7,006,031 B1 | 2/2006 | Abatzoglou et al. |
| 7,301,495 B2 | 11/2007 | Abatzoglou et al. |
| 7,532,150 B1 | 5/2009 | Abatzoglou et al. |
| 2004/0028271 A1 | 2/2004 | Pollard et al. |
| 2008/0127031 A1 | 5/2008 | Olsson et al. |
| 2011/0080580 A1 | 4/2011 | Fermann et al. |

OTHER PUBLICATIONS

"International Application Serial No. PCT/US2017/042781, Written Opinion dated Mar. 28, 2018", 7 pgs.

DEVICE AND METHOD OF MULTI-DIMENSIONAL FREQUENCY DOMAIN EXTRAPOLATION OF SENSOR DATA

TECHNICAL FIELD

Some embodiments pertain to radar devices. Some embodiments relate to sonar devices. Some embodiments relate to sensors, including coherently pulsed sensors. Some embodiments relate to frequency data processing, including frequency data processing in two dimensions. Some embodiments relate to image processing, including image processing in two or more dimensions. Some embodiments relate to extrapolation and/or interpolation, including extrapolation and/or interpolation in two or more dimensions.

BACKGROUND

In some scenarios, information about a physical environment may be determined by a device, such as a radar device, sonar device or other device. For instance, a topology of the environment, a physical condition of the environment, a speed or position of an element in the environment or other aspects may be determined. Various techniques that utilize sensors, such as coherently pulsed sensors, may be used in some cases. As an example, the sensors may collect time data and/or frequency data for further processing to determine various pieces of information about the environment. When a portion of the time data and/or frequency data is incomplete, flawed, noisy or missing, the desired output of the device may be inaccurate. Accordingly, there is a general need for methods and systems to improve processing of such data in these and other scenarios.

DETAILED DESCRIPTION

The following description and the drawings sufficiently illustrate specific embodiments to enable those skilled in the art to practice them. Other embodiments may incorporate structural, logical, electrical process, and other changes. Portions and features of some embodiments may be included in, or substituted for, those of other embodiments. Embodiments set forth in the claims encompass all available equivalents of those claims.

Figure 1:
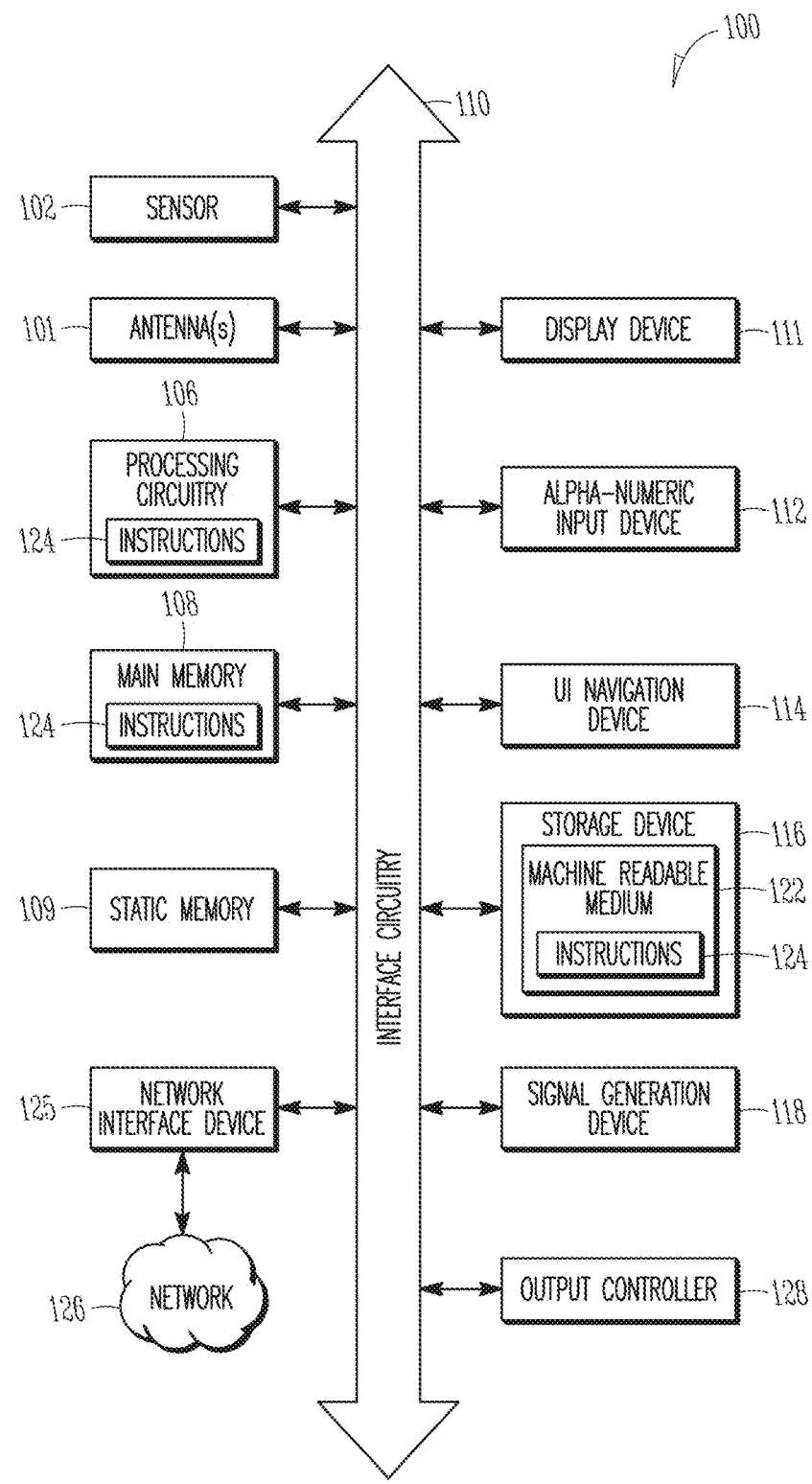
FIG. 1 illustrates an example device in accordance with some embodiments.

FIG. 1 illustrates an example of a device in accordance with some embodiments. In some embodiments, the device 100 may be or may be part of a radar device, a sonar device, a communication device, a surveillance device, a piece of equipment, a piece of test equipment or any other suitable type of device. As an example, a radar device may be used to determine motion, speed, position, topology and/or other aspects of various elements in a physical environment. As another example, a sonar device may be used to determine similar aspects of elements in environments that may include, but are not limited to, underwater environments. In the embodiments described herein, the device 100 may also be referred to as a frequency data extrapolator. Alternatively, portions of the device 100 may be referred to collectively as a frequency data extrapolator.

It should be noted that embodiments are not limited to the example device 100 shown in FIG. 1, in terms of number, type, name and/or arrangement of components. Some embodiments may not necessarily include all components shown in the example device 100. Some embodiments may include additional components not shown in the example device 100. In some embodiments, one or more components may be used in place of one or more components shown in the example device 100 and may provide same or similar functionality to components shown in the example device 100.

In some embodiments, the example device 100 may include one or more antennas 101. The antenna 101 may be configured to transmit and/or receive signals, in some cases. In some embodiments, the example device 100 may include one or more sensors 102. As a non-limiting example, a coherently pulsed sensor 102 may be used. Although embodiments may be described herein in terms of a single sensor 102, it is understood that multiple sensors 102 and/or a combination of sensors 102 may be used in some embodiments. The sensor 102 may be configured to transmit and/or receive signals, in some cases, although the scope of embodiments is not limited in this respect. In some embodiments, the device 100 may not necessarily include the antenna 101, such as embodiments in which the sensor 102 may perform transmission and/or reception operations. In some embodiments, a combination of one or more antennas 101 and one or more sensors 102 may be included in the device 100. The antenna(s) 101, in such embodiments, may be coupled to the sensors 102 (such as through interface circuitry 110 of the device) to provide received signals to the sensors 102 and/or to receive signals from the sensors 102 for transmission. The interface circuitry 110 may connect one or more of the components of the device 100 to each other and/or to external components. The interface circuitry 110 may be wired, in some embodiments, although other configurations, such as wireless or optical, may be used in some embodiments.

The device 100 may also include processing circuitry 106 and memory 108 arranged to perform operations described herein. In some embodiments, the device 100 may be a frequency data extrapolator, which may be configured to perform various operations described herein. In some embodiments, one or more components of the device 100 may be configured to perform one or more operations related to frequency data extrapolation and/or frequency data processing, such as those described herein and/or others. As an example, processing circuitry 106, memory 108 and/or other components of a device 100, such as a radar device, may be configured to perform one or more of operations described herein related to frequency data extrapolation and/or other operations. As another example, a frequency data extrapolator may include one or more of the components of the device 100, such as processing circuitry 106, memory 108 and/or others. As another example, the frequency data extrapolator may be implemented using one or more of the components of the device 100, such as processing circuitry 106, memory 108 and/or others, and those components may implement other operations that may or may not be related to frequency data extrapolation and/or frequency data processing.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software. The machine readable medium 122 may be used to implement one or more operations described herein, such as those described herein as performed by the frequency data processor and/or device 100, in some cases.

Any one or more of the techniques, operations, methods and/or methodologies discussed herein may be performed on such a device 100, in some embodiments. In alternative embodiments, the device 100 may operate as a standalone device or may be connected (e.g., networked) to other devices. In a networked deployment, the device 100 may operate in the capacity of a server machine, a client machine, or both in server-client network environments. In an example, the device 100 may act as a peer machine in peer-to-peer (P2P) (or other distributed) network environment. In some embodiments, the device 100 may be a radar device, sonar device, personal computer (PC), a tablet PC, a set-top box (STB), a personal digital assistant (PDA), a mobile device, a base station, a mobile telephone, a smart phone, a web appliance, a network router, switch or bridge, or any machine capable of executing instructions (sequential or otherwise) that specify actions to be taken by that device. Further, while only a single device is illustrated, the term "device" shall also be taken to include any collection of devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

As a non-limiting example, a module may include a group of components connected to (permanently, temporarily and/or semi-permanently) a circuit board, processor board and/or other medium.

The processing circuitry 106 may be or may include a hardware processor, such as a central processing unit (CPU), a graphics processing unit (GPU), a hardware processor core, or any combination thereof. The device 100 may include a main memory 108 and a static memory 109, some or all of which may communicate with each other via the interface circuitry 110. In some embodiments, components of the device 100 may communicate with each other via the interface circuitry 110. The interface circuitry 110 may include wired connections, in some embodiments, such as connections between components of the device 100.

The device 100 may further include a display unit 111, which may provide video display. The device 100 may include an alphanumeric input device 112 (e.g., a keyboard), and a user interface (UI) navigation device 114 (e.g., a mouse). In an example, the display unit 111, input device 112 and/or UI navigation device 114 may be or may include a touch screen display. The device 100 may additionally include a storage device 116 (e.g., drive unit), a signal generation device 118 (e.g., a speaker) for audio output and/or a network interface device 125. The device 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 116 may include a machine readable medium 122 on which may be stored one or more sets of data structures or instructions 124 (e.g., software) embodying or utilized by any one or more of the techniques or functions described herein. The instructions 124 may also reside, completely or at least partially, within the main memory 108, within static memory 109, or within the processing circuitry 106 during execution thereof by the device 100.

In an example, one or any combination of the processing circuitry 106, the main memory 108, the static memory 109, or the storage device 116 may constitute machine readable media. While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the device 100 and that cause the device 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some embodiments, the term "computer readable storage medium" may be used to describe such a medium.

The instructions 124 may further be transmitted or received over a communications network 126 using a transmission medium via the network interface device 125 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®. IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. In an example, the network interface device 125 may include one or more physical jacks (e.g., Ethernet, coaxial, or phone jacks) or one or more antennas to connect to the communications network 126. In an example, the network interface device 125 may include a plurality of antennas to wirelessly communicate using at least one of single-input multiple-output (SIMO), multiple-input multiple-output (MIMO), or multiple-input single-output (MISO) techniques. In some examples, the network interface device 125 may wirelessly communicate using Multiple User MIMO techniques. The term "transmission medium" shall be taken to include any intangible medium that is capable of storing, encoding or carrying instructions for execution by the device 100, and includes digital or analog communications signals or other intangible medium to facilitate communication of such software.

Although the device 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 2:
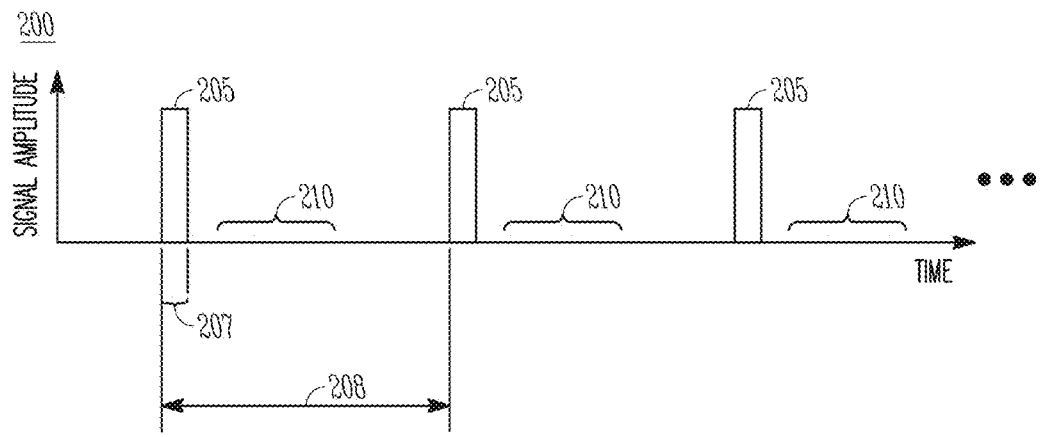
FIG. 2 illustrates an example of pulsed sensor operation in accordance with some embodiments.
Figure 3:
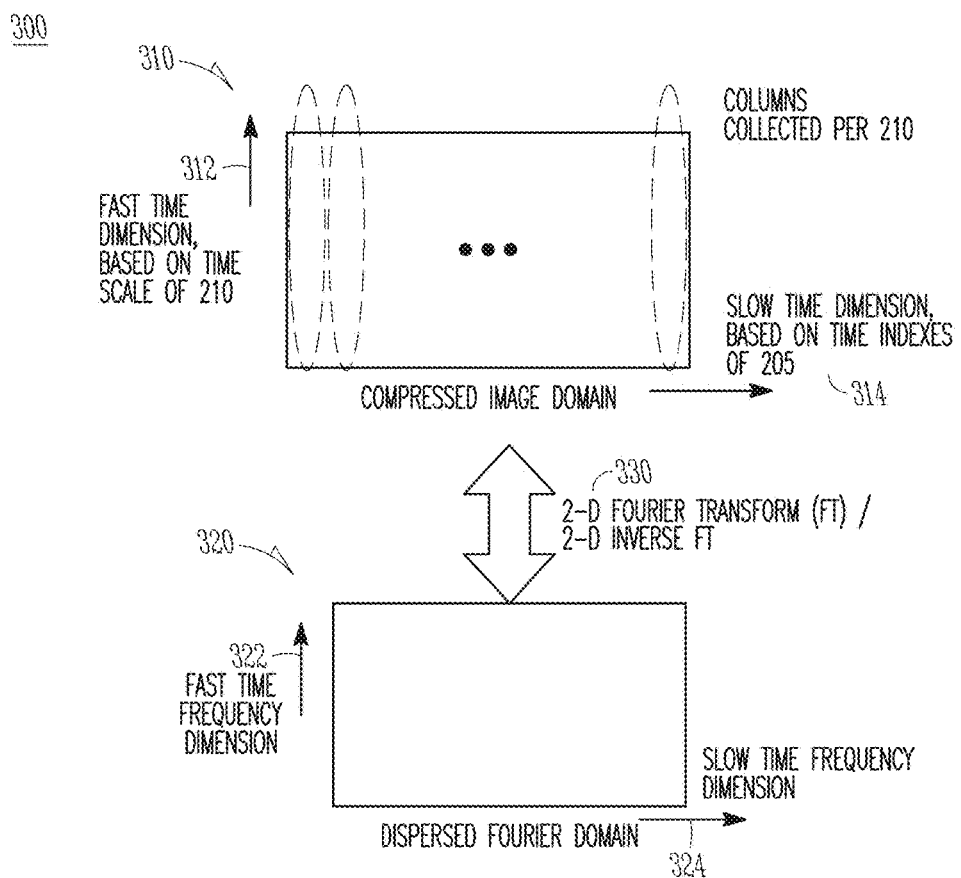
FIG. 3 illustrates examples of a compressed image domain and a dispersed Fourier domain in accordance with some embodiments.

FIG. 2 illustrates an example of pulsed sensor operation in accordance with some embodiments. FIG. 3 illustrates examples of a compressed image domain and a dispersed Fourier domain in accordance with some embodiments. It should be noted that the examples shown in FIGS. 2-3 may illustrate some or all of the concepts and techniques described herein in some cases, but embodiments are not limited by the examples. For instance, embodiments are not limited by the name, number, type, size, ordering, arrangement and/or other aspects of the pulses, collection windows, times, time indexes, time dimensions (such as fast time and slow time), frequency dimensions (such as fast time frequency and slow time frequency) and/or other elements as shown in FIGS. 2-3.

Referring to FIG. 2, in the example scenario 200, a sequence of time pulses 205 may be transmitted by the sensor 102. Periodic transmission, in accordance with a periodicity interval 208, of the pulses 205 may be used in some embodiments. In addition, the pulses 205 may also be of a fixed time duration 207 in some embodiments. In some cases, the periodicity parameter 208 may be much larger than the time duration 207, such as by one or two orders of magnitude. It should be noted that embodiments are not limited to periodic transmission or to fixed duration transmission. In an example, electromagnetic (EM) pulses may be used in some applications, such as radar. In another example, pulses based on soundwaves, may be used in some applications, such as sonar. It should be noted, however, that embodiments are not limited to usage of EM pulses or pulses based on soundwaves.

The sensor 102 may receive and/or collect signals during collection windows 210. As a non-limiting example, the signals may be return signals that result from transmitted pulses 205. The return signals may be affected by the environment, such as by objects in the environment. For instance, when a pulse 205 is transmitted, a return signal may include a portion of the transmitted energy that was reflected back to the sensor 102 by an object in the environment. The return signal may also be spread, smeared and/or otherwise distorted in comparison to the original pulse 205. As an example, a relatively narrow time pulse may be partly reflected back to the sensor 102 as a distorted shape that is of highly reduced energy in comparison to the original pulse 205 and spread/distorted in time in comparison to the original pulse 205. In some embodiments, the device 100 may be able to determine information about the environment based on the effects exhibited in the return signals. For instance, one or more parameters of the physical environment may be determined, including but not limited to motion, speed, acceleration, position, topology and/or other aspects of various elements in a physical environment. Such parameters may also include topology, atmospheric pressure, atmospheric aspects and/or other parameters related to the physical environment. It should be noted that the transmission of the pulses and collection/reception of the return signals may be performed by the sensor 102 in some embodiments. However, the device 100 and/or other components of the device 100 (such as an antenna 101) may also be used for this purpose, in some embodiments.

Referring to FIG. 3, the example 300 shows a compressed image domain 310 and a dispersed Fourier domain 320. In some embodiments, the domains 310 and 320 may be related by a two-dimensional Fourier Transform (FT) and a two-dimensional inverse FT, as indicated by 330. In a non-limiting example, the x-axis of the compressed image domain 310 may represent a slow time dimension 314 and the y-axis of the compressed image domain 310 may represent a fast time dimension 312. The x-axis of the dispersed Fourier domain 320 may represent a slow time frequency dimension 324 and the y-axis of the dispersed Fourier domain 320 may represent a fast time frequency dimension 322.

The slow time dimension 314 may be based on time indexes/counts of the pulses 205 while the fast time dimension 312 may be based on a time scale, such as a length or duration, of the collection window 210. Accordingly, for a particular time pulse 205, a column of the compressed image domain 310 may include complex values that are based on a return signal collected at the sensor 102 during the collection window 210 immediately following the particular time pulse 205. Columns of the compressed image domain 310 may be based on successive return signals based on successive time pulses 205. The values of the compressed image domain 310 and/or dispersed Fourier domain 320 may be complex, in some embodiments. However, embodiments are not limited to complex values for either of the compressed image domain 310 and/or dispersed Fourier domain 320.

In some embodiments, processing may be performed in the compressed image domain 310 and/or dispersed Fourier domain 320. In some cases, a processing operation may be easier, faster, more efficient and/or otherwise more applicable in one of the dimensions. As an example, a convolution operation in a first of the domains may be performed in the second of the domains using multiplication operations, in some cases. Accordingly, it may be preferable to perform processing in the second domain, in this particular case, as multiplication may be less computationally intense than convolution. In some embodiments, various imaging effects may be more pronounced in a first of the domains in comparison to the second domain, in which case operations may be performed in the first domain.

In accordance with some embodiments, the frequency data extrapolator may receive input frequency data mapped to a two-dimensional frequency grid. As an example, the input frequency data may be based on return signals received, at a sensor of the device 100, in response to pulsed transmissions of the sensor in a physical environment. Regions of the frequency grid may be classified as high fidelity or low fidelity. A group of basis rectangles may be determined within the high fidelity regions. A column-wise extrapolation matrix and a row-wise extrapolation matrix may be determined based on the input frequency data of the basis rectangles. The input frequency data of the high fidelity regions may be extrapolated to replace the input frequency data of the low fidelity regions. These embodiments will be described in more detail below.

It should be noted that references herein to extrapolation and/or extrapolation operations are not limiting. Other techniques, such as interpolation, extension, approximation and/or others may be used in some embodiments. In addition, a combination of one or more of extrapolation, interpolation, extension, approximation and/or other techniques may be used in some embodiments. As an example, a value for a particular pixel of a two-dimensional grid may be replaced by a value that is based on values of other pixels in the grid. For instance, the other pixels may include pixels near the particular pixel or regions of pixels that surround the particular pixel. Depending on locations of the other pixels with respect to the particular pixel, the determination of the value for the particular pixel may be considered an extrapolation, an interpolation or a combination thereof. Although the term "extrapolation" may be used herein to describe this operation and/or other operations, the scope of embodiments is not limited by usage of the term "extrapolation."

Figure 4:
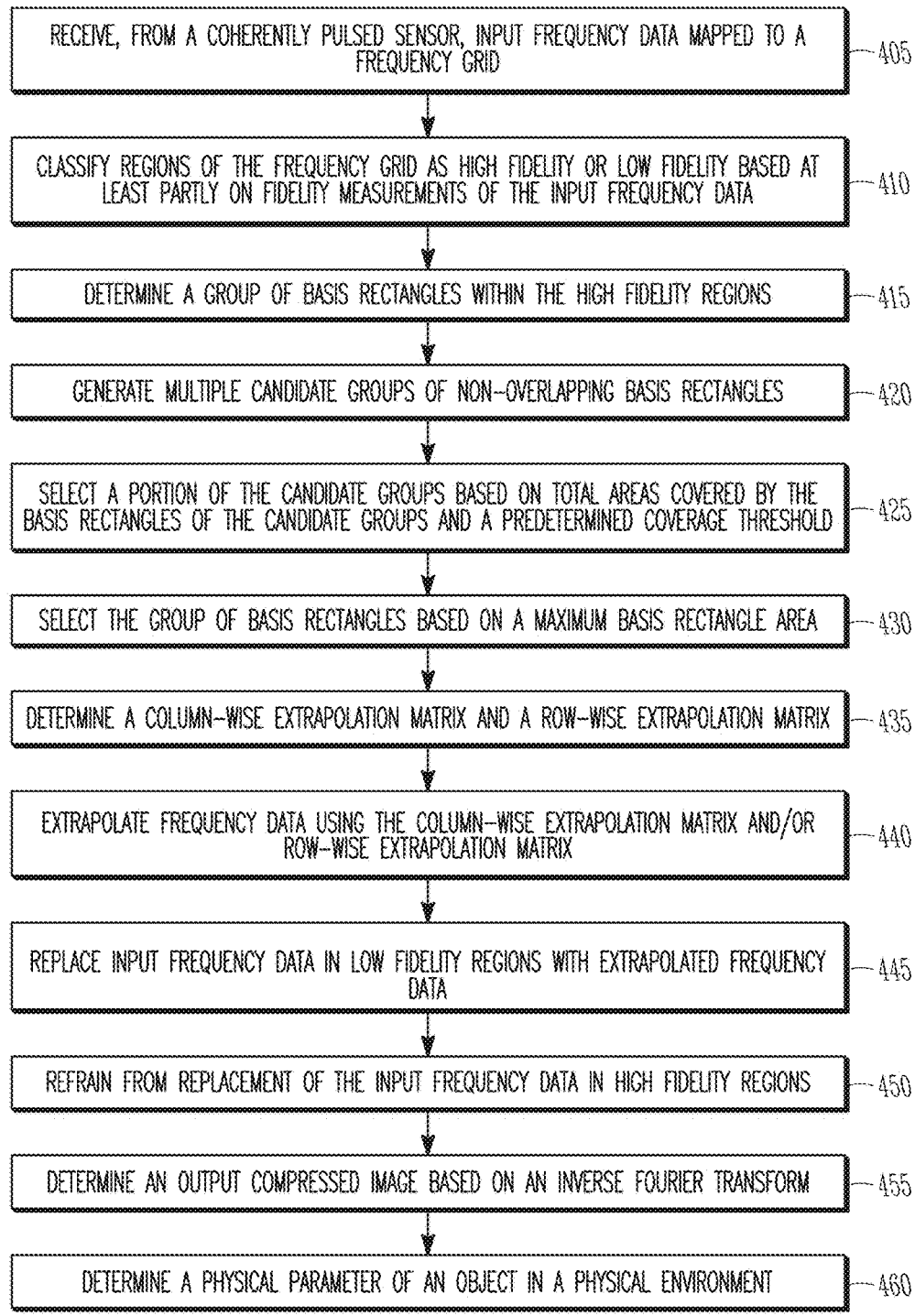
FIG. 4 illustrates the operation of an example method of frequency domain extrapolation of sensor data in accordance with some embodiments.

FIG. 4 illustrates the operation of an example method of frequency domain extrapolation of sensor data in accordance with some embodiments. In some embodiments, the method 400 may be performed by the device 100. One or more components of the device 100 may perform one or more operations of the method 400, in some embodiments. As an example, the processing circuitry 106 may perform one or more operations of the method 400, including but not limited to operations that are related to extrapolation of frequency data. As another example, the frequency data extrapolator described previously may perform one or more operations of the method 400, including but not limited to operations that are related to extrapolation of frequency data. As another example, the sensor 102 may perform transmission, reception and/or collection operations of the method 400. Embodiments are not limited by these examples, however, as operations may be performed by other components and/or other devices, in some embodiments.

It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-10, although it is understood that the method 400 may be practiced with any other suitable systems, interfaces and components. It should also be noted that the method 400 may be applicable to an apparatus for the device 100, in some embodiments.

Figure 5:
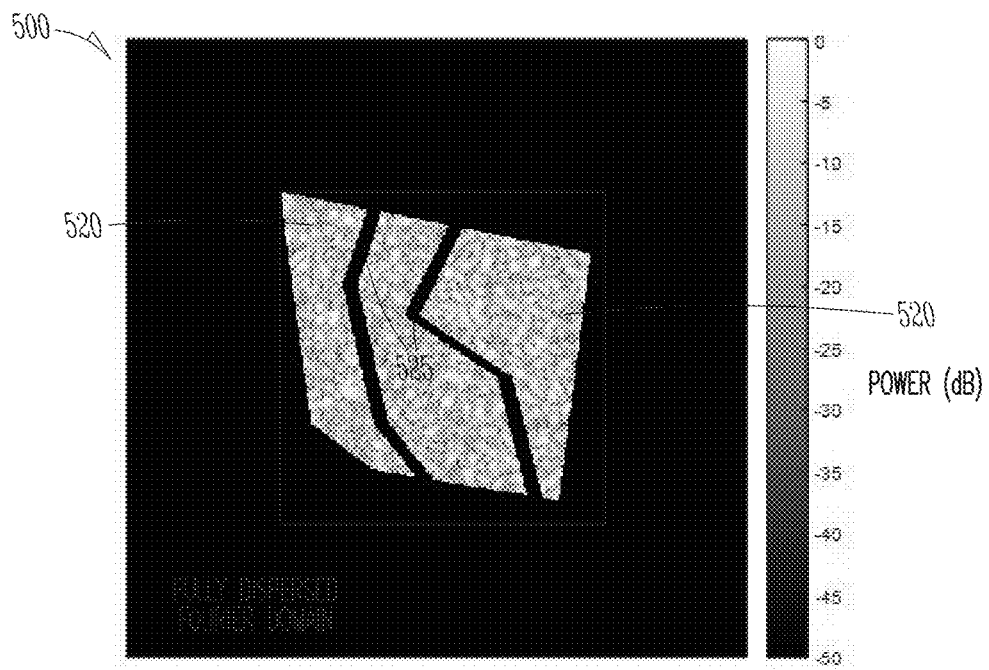
FIG. 5 illustrates additional examples of a compressed image domain and a dispersed Fourier domain in accordance with some embodiments.
Figure 5:
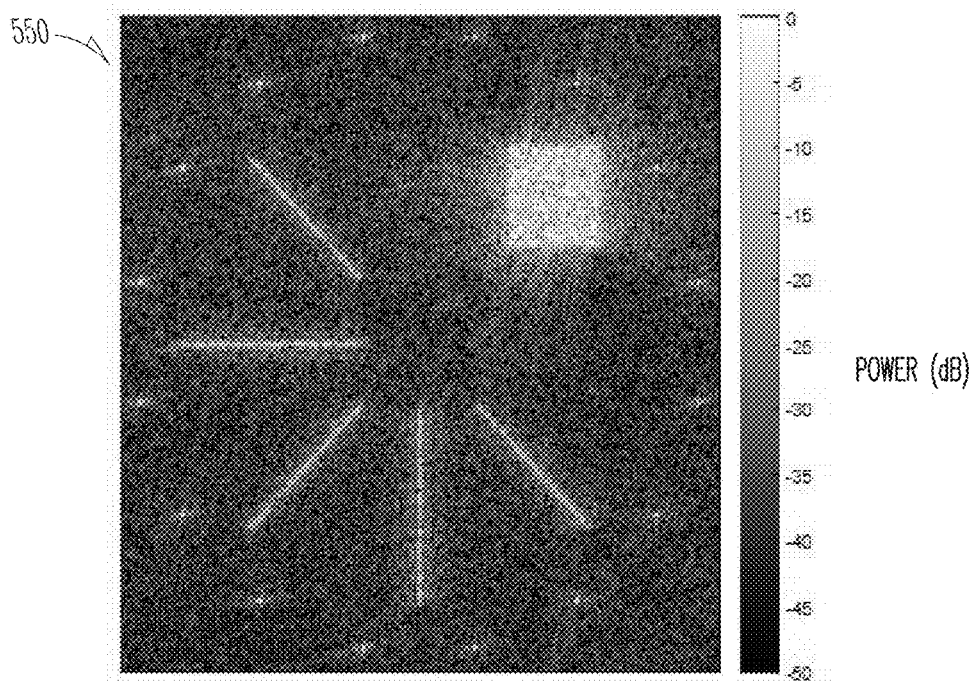
Figure 6:
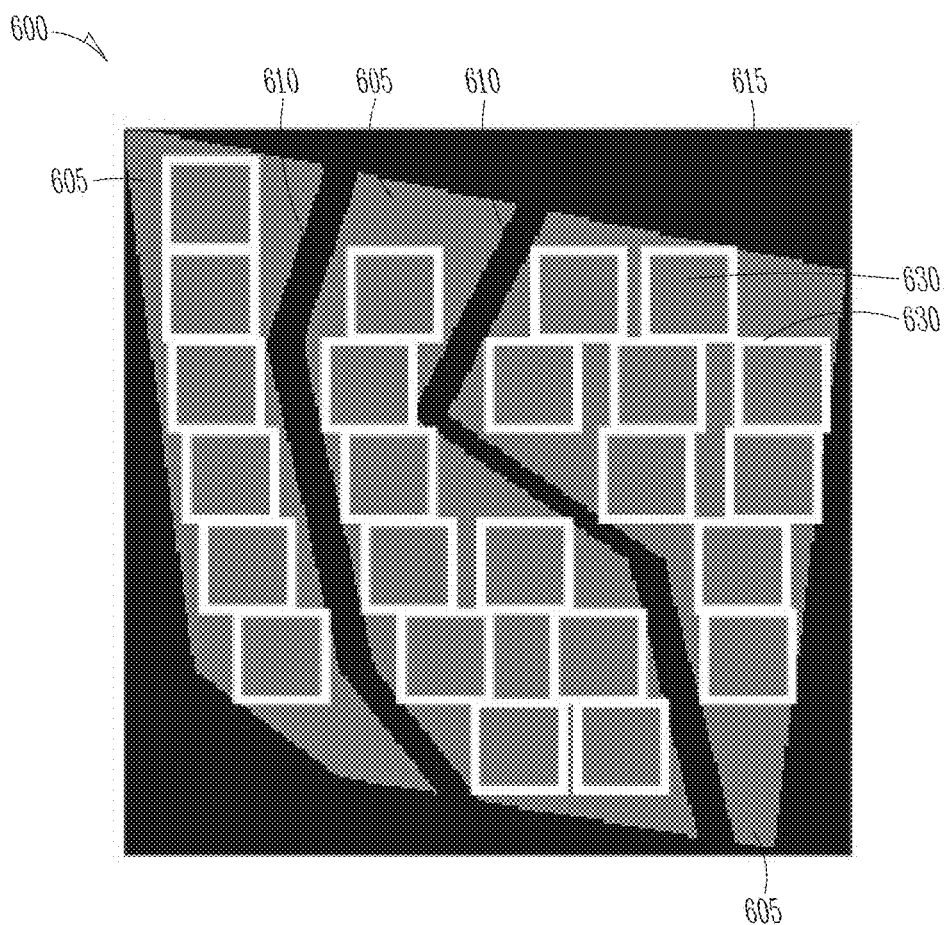
FIG. 6 illustrates an example of a group of basis rectangles in accordance with some embodiments.
Figure 7:
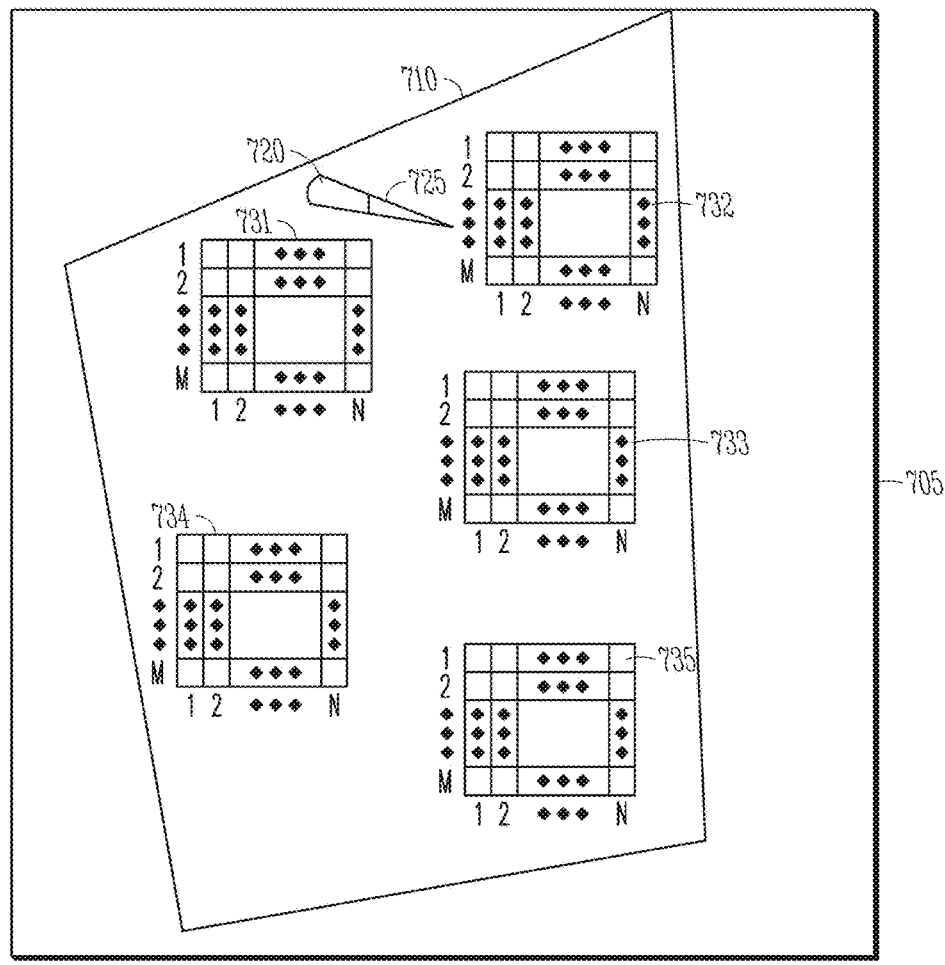
FIG. 7 illustrates an example of determination of extrapolation matrixes in accordance with some embodiments.
Figure 7:
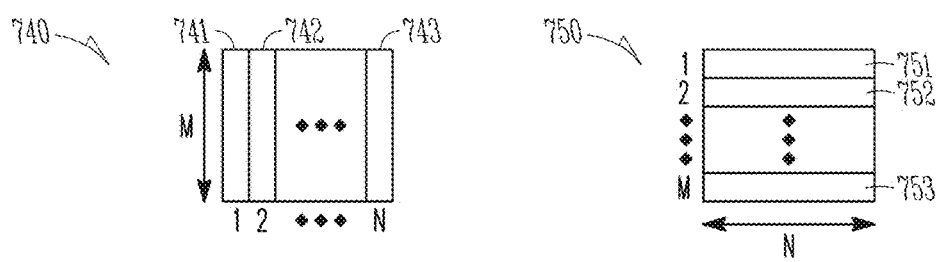
Figure 8:
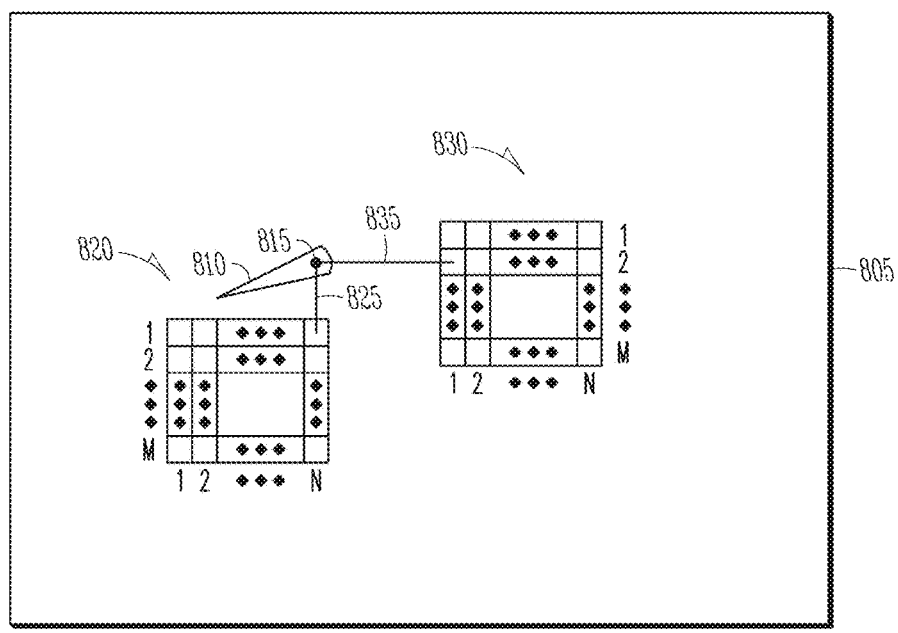
FIG. 8 illustrates an example of extrapolation in accordance with some embodiments.
Figure 9:
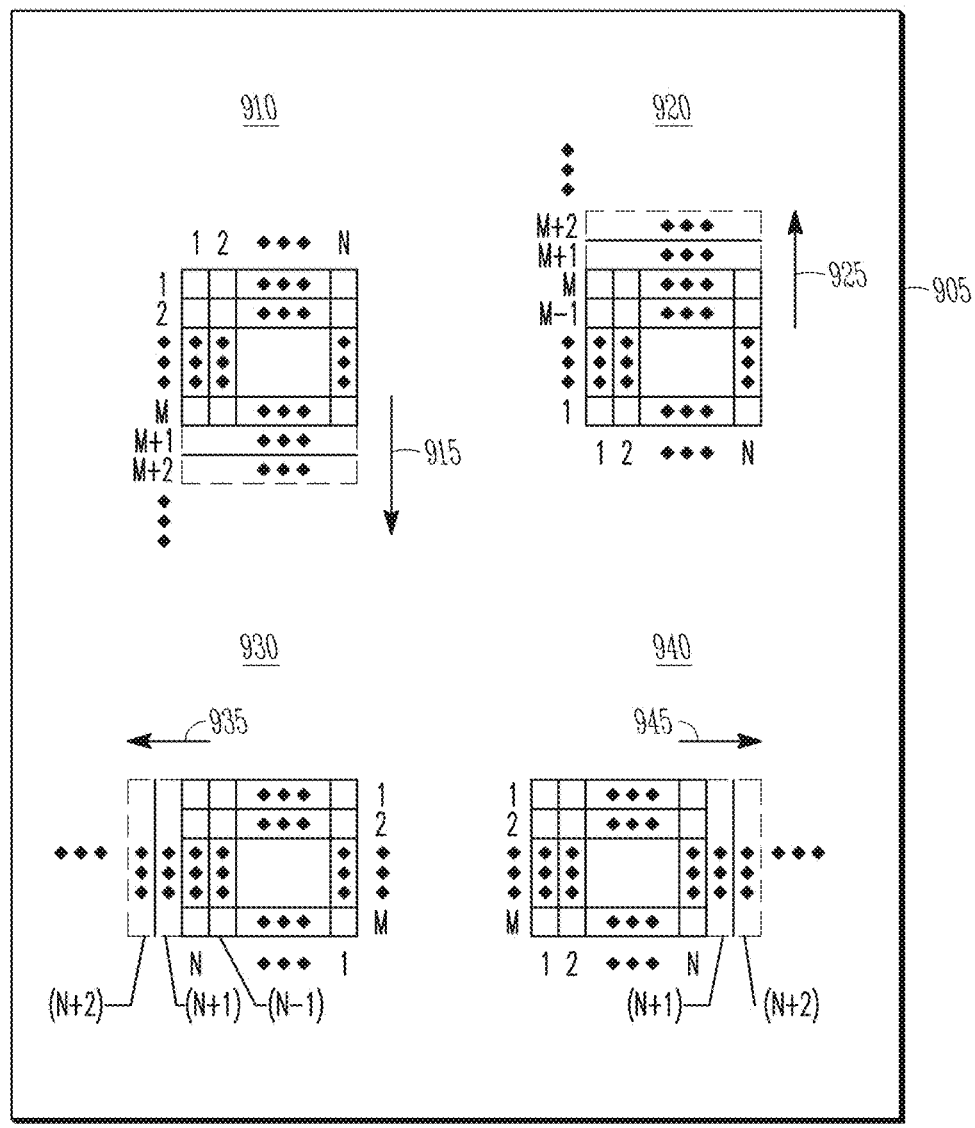
FIG. 9 illustrates additional examples of extrapolation in accordance with some embodiments.
Figure 10:
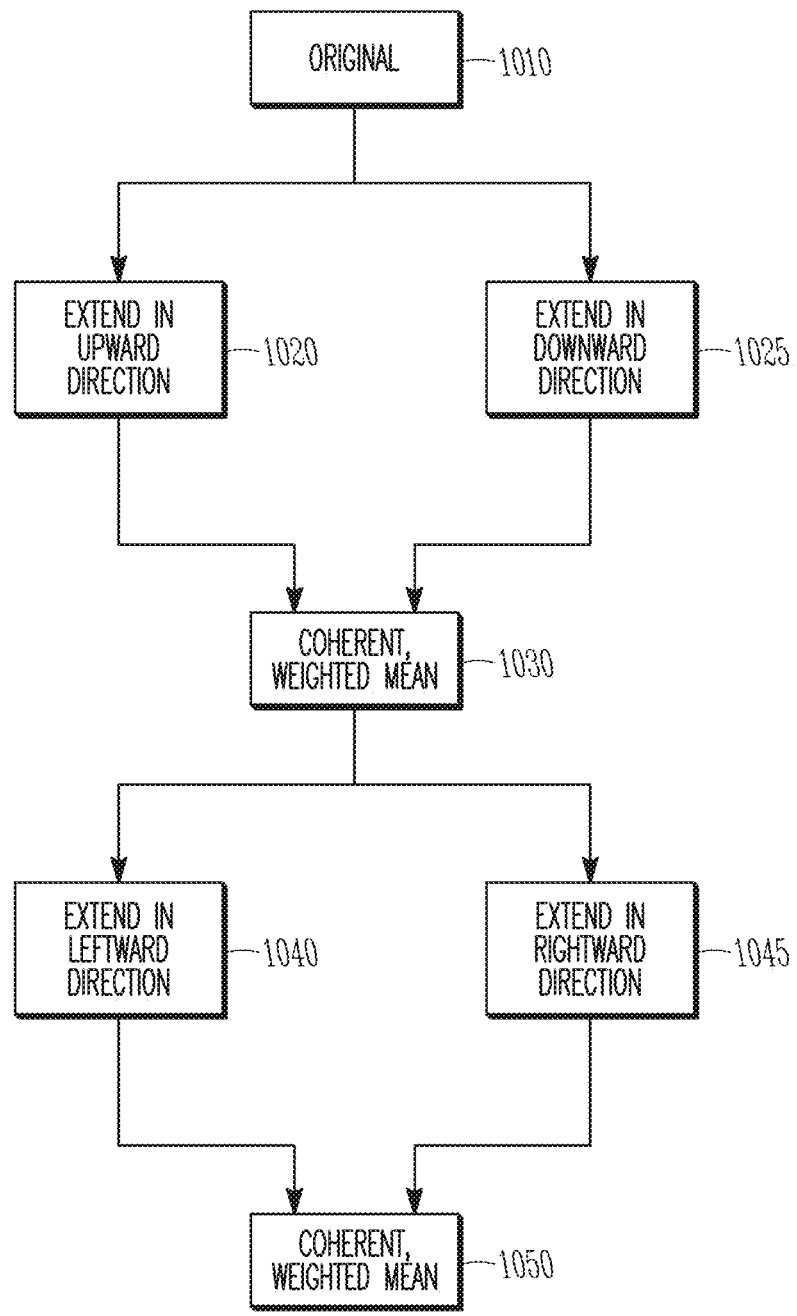
FIG. 10 illustrates an additional example of extrapolation in accordance with some embodiments.

FIGS. 5-10 illustrate examples that may be applicable to some embodiments. FIG. 5 illustrates additional examples of a compressed image domain and a dispersed Fourier domain in accordance with some embodiments. FIG. 6 illustrates an example of a group of basis rectangles in accordance with some embodiments. FIG. 7 illustrates an example of determination of extrapolation matrixes in accordance with some embodiments. FIGS. 8-10 illustrate examples of extrapolation in accordance with some embodiments. It should be noted that the examples shown in FIGS. 5-10 may illustrate some or all of the concepts and techniques described herein, in some cases, but embodiments are not limited by the examples. For instance, embodiments are not limited by the name, number, type, size, ordering, arrangement and/or other aspects of the frequency grid, frequency data, time data, extrapolation matrixes, extrapolation techniques, basis rectangles, other rectangles, regions of the frequency grid and/or other elements as shown in FIGS. 5-10.

At operation 405 of the method 400, the processing circuitry 106 may receive input frequency data mapped to a two-dimensional frequency grid. In some embodiments, the input frequency data may be received from the coherently pulsed sensor 102 and may be based on return signals from pulsed transmissions of the sensor 102, although the scope of embodiments is not limited in this respect. As a non-limiting example, pulsed transmissions such as those illustrated in FIG. 2 may be performed by the coherently pulsed sensor 102, and return signals may be mapped to a compressed image domain (such as 310 in FIG. 3) and/or dispersed Fourier domain (such as 320 in FIG. 3). Additional examples of a compressed image domain 550 and a dispersed Fourier domain 500 are shown in FIG. 5.

As another non-limiting example, the input frequency data may be mapped to the frequency grid in a dispersed Fourier format that is based on a two-dimensional Fourier transform of two-dimensional compressed image data from the sensor 102. Each column of the compressed image data may be based on a return signal from one of the pulsed transmissions of the sensor 102. The columns may be based on sequential return signals in chronological order, in some cases. For instance, a first column may be based on a first chronological return signal, a second column may be based on a second chronological return signal and the relationship may be extended for subsequent columns.

At operation 410, the processing circuitry 106 may classify regions of the frequency grid as high fidelity or low fidelity. An example of such is shown in FIG. 5, in which the regions 520 (of the lighter, gray and white colors) may be classified as high fidelity and the regions 525 (of the darker, black color) may be classified as low fidelity. Another example of such is shown by the frequency grid 600 shown in FIG. 6, in which the regions 605 (demarcated by the gray color) may be classified as high fidelity and the regions 610 (demarcated by the black color, and located between the regions 605) may be classified as low fidelity. The regions 615 (demarcated by the black color, and located outside of the regions 605 and 610) may be regions of the frequency grid 600 that are zero padded. The zero padding may be performed for purposes such as achievement of a Nyquist sampling rate and/or other purpose.

It should be noted that embodiments are not limited to two classifications and are also not limited to the particular classifications of high fidelity and low fidelity. For instance, other categories, such as valid/invalid, good/bad, present/missing, present/absent or other may be used.

The classification may be based at least partly on one or more fidelity measurements of the input frequency data, in some cases. The measurements may be performed for individual pixels of the frequency grid, regions of pixels (such as contiguous regions of pixels) in the frequency grid, any suitable grouping of the pixels and/or any suitable division of the frequency grid. In some embodiments, the frequency grid may be divided, based on fidelity measurements of the pixels, into a group of one or more low fidelity regions and a group of high fidelity regions. The regions in this example may include contiguous groups of the pixels.

Examples of fidelity measurements may include amplitude level, power level, signal level, signal quality level, noise level artifact level and/or other measurements. As an example, fidelity measurements of the input frequency data may include amplitude measurements of the input frequency data, and regions may be classified as high fidelity or low fidelity based at least partly on comparisons of the amplitude measurements with a predetermined amplitude threshold. For instance, referring to FIG. 5, the power scale (given in dB) at the right side of the dispersed Fourier domain 500 indicates that colors of pixels in the grid 500 become darker as the amplitude and/or power decreases. The value in dB may be with respect to a peak amplitude/power of all pixels of the grid 500, an average amplitude/power of all pixels of the grid 500 or other suitable parameter. As an example, the darkest regions 525 may be considered low fidelity regions and the lighter regions 520 may be considered high fidelity regions. A threshold, such as −30 dB, −40 dB or other suitable value (including scalar values and/or non-dB values) may be used, in which case pixels/regions for which amplitudes/powers are below the threshold may be classified as low fidelity. Other pixels/regions for which amplitudes/powers are above or equal to the threshold may be classified as high fidelity. In some cases, such a threshold may be predetermined, although the scope of embodiments is not limited in this respect. Embodiments are not limited to these examples, however, as other suitable measurements and/or techniques may be used to classify the regions. In some embodiments, it may be determined that the input frequency data in a group of one or more regions is missing, for any suitable reason. In such cases, those regions may be treated in a similar manner as the low fidelity regions.

At operation 415, the processing circuitry 106 may determine a group of basis rectangles within the high fidelity regions. As will be described below in more detail, the basis rectangles may be used, in some embodiments, to determine one or more parameters of an extrapolation model. Referring to FIG. 6, a non-limiting example of basis rectangles 630 included in the high fidelity regions 605 is illustrated.

In some embodiments, the high fidelity regions (such as a combined region) may be divided to include a group of non-overlapping basis rectangles of a same basis rectangle size. In such cases, it is understood that one or more "leftover" portions may result, as the high fidelity regions may not necessarily be rectangle, straight or otherwise uniform, and therefore may not be completely covered by a group of basis rectangles.

In some embodiments, the group of basis rectangles may be restricted to a group of non-overlapping rectangles of a same basis rectangle size. The rectangle size may include a pair of dimensions, such as a length and height, a number of pixels in each of two dimensions, a length in terms of an x-coordinate and a length in terms of a y-coordinate and/or other pair. The group of basis rectangles may be determined in accordance with a joint maximization of a basis rectangle area and a portion of the high fidelity regions covered by the basis rectangles, in some cases.

As a non-limiting example, the processing circuitry 106 may generate multiple candidate groups of non-overlapping basis rectangles within the high fidelity regions (such as at operation 420). In some cases, the candidate groups may be generated by arbitrarily choosing from among the many possible configurations of basis rectangles, although the scope of embodiments is not limited in this respect. Within each candidate group, a basis rectangle size may be the same. But the basis rectangle set of at least some of the candidate groups may be different. That is, the rectangle size may be varied across candidate groups but may be the same within each candidate group. In addition, locations of the rectangles of each candidate groups may be varied across the candidate groups, in some cases. It may be desired, in some cases, that the rectangle size (or an area of the rectangle) be as large as possible. Accordingly, rectangle area may be a criterion used, in some embodiments, in selecting the group of basis rectangles from the candidate groups. As a non-limiting example of selection of the basis rectangles in accordance with a joint criterion, if a total area covered by the basis rectangles is greater than a predetermined threshold, such as 50% (or any suitable percentage and/or quantity) of the area of the high fidelity regions, then a maximization of the area of each basis rectangle may be prioritized. Otherwise, a maximization of the total area covered by the basis rectangles may be prioritized.

Other criteria may be used, in addition to or instead of, the rectangle size or rectangle area. As an example, an amount of area covered by each candidate group may also be used. The coverage may be given or determined in terms of an area of the frequency grid, a percentage (ratio) of the frequency grid, a percentage (ratio) of the high fidelity regions and/or other suitable measurement.

It should be noted that, as the rectangles may be restricted to non-overlapping rectangles within a limited area (the high fidelity regions), a number of such rectangles that may fit into the limited area may be related to the rectangle size. For instance, as the rectangle size increases, a number of rectangles that can fit into the limited area may decrease (or at least not increase). Accordingly, a number of rectangles in each candidate group may be variable and may be a function of rectangle size, size of the high fidelity regions, layout (shape) of the high fidelity regions and/or other factors.

It should be noted that the group of basis rectangles may be selected from the candidate groups in accordance with a trade-off between rectangle size and coverage, in which it may be desired that both be as large as possible. However, as noted above, a number of rectangles that can fit into the limited area may decrease as the rectangle size increases. Therefore, the coverage ratio may also decrease. In some embodiments, one or more thresholds, such as minimum size, minimum basis rectangle area, minimum coverage and/or others may be used for selection of the group of basis rectangles from the candidate groups. For instance, one or more thresholds may be used in combination, in some cases.

As a non-limiting example, the processing circuitry 106 may select a portion of the candidate groups for which total areas covered by the basis rectangles of the candidate groups are greater than a predetermined coverage threshold at operation 425. The processing circuitry 106 may select the group of basis rectangles as a candidate group from the portion based on the basis rectangle area of each candidate group at operation 430. For instance, the group (or one of the groups) with maximum basis rectangle area may be selected. These examples are not limiting, however, as other techniques may be used to select the group of basis rectangles.

At operation 435, the processing circuitry 106 may determine a column-wise extrapolation matrix and a row-wise extrapolation matrix. The matrixes may be of a same size (in terms of rows and columns of pixels) as the basis rectangles. The matrixes may be determined for a two-dimensional extrapolation of the input frequency data of the high fidelity regions to replace the input frequency data of the low fidelity regions, in some cases.

As a non-limiting example, columns of the column-wise extrapolation matrix may be determined per column based on the input frequency data of corresponding columns of the basis rectangles. That is, a particular column of the column-wise extrapolation matrix may be determined using the input frequency data of the same column within each of the basis rectangles (or in each of at least a portion of the basis rectangles). For instance, the columns of the column-wise extrapolation matrix may be numbered by a sequence of column indexes (such as 1, 2, . . . . N). The columns of each basis rectangle may also be numbered in the same manner. For each column index, the column of the column-wise extrapolation matrix for that particular index may include a set of weights determined based on the input frequency data of the columns of the basis rectangles mapped to the particular index. For instance, the values of column #1 of the column-wise extrapolation matrix may be based on the input frequency data in column #1 of all (or at least some) of the basis rectangles. The values of column #2 of the column-wise extrapolation matrix may be based on the input frequency data in column #2 of all (or at least some) of the basis rectangles. This relationship may be extended to the N columns of the column-wise extrapolation matrix and basis rectangles.

A non-limiting example of the technique described above is shown in FIG. 7. For instance, the values of column #1 (741) of the column-wise extrapolation matrix 740 may be based on the input frequency data in column #1 of all (or at least some) of the basis rectangles 731-735. The values of column #2 (742) of the column-wise extrapolation matrix 740 may be based on the input frequency data in column #2 of all (or at least some) of the basis rectangles 731-735. This relationship may be extended to the N columns of the column-wise extrapolation matrix 740 and basis rectangles 731-735.

Any suitable technique may be used to determine the values of the column-wise extrapolation matrix. As a non-limiting example, the values for a particular column may be based on correlations between the input frequency data of corresponding columns of the basis rectangles. Techniques such as a Burg algorithm. Yule-Walker algorithm, Wiener-Hopf algorithm, linear prediction algorithm other algorithms and/or a combination thereof may be used, in some cases. In some embodiments, one or more values of the extrapolation matrixes may be complex. However, the scope of embodiments is not limited in this respect, as real values may be applicable, in some cases.

Analogous, similar, or the same techniques used for the determination of the column-wise extrapolation matrix may be used to determine the row-extrapolation matrix. For instance, rows of the row-wise extrapolation matrix may be determined per row based on the input frequency data of corresponding rows of the basis rectangles. That is, a particular row of the row-wise extrapolation matrix may be determined using the input frequency data of the same row within each of the basis rectangles (or in each of at least a portion of the basis rectangles). For instance, the rows of the row-wise extrapolation matrix may be numbered by a sequence of row indexes (such as 1, 2, . . . . M) and the rows of each basis rectangle may be numbered in the same manner. For each row index, the row of the row-wise extrapolation matrix for that particular index may include a set of weights determined based on the input frequency data of the rows of the basis rectangles mapped to the particular index. For instance, the values of row #1 of the row-wise extrapolation matrix may be based on the input frequency data in row #1 of all (or at least some) of the basis rectangles. The values of row #2 of the row-wise extrapolation matrix may be based on the input frequency data in row #2 of all (or at least some) of the basis rectangles. This relationship may be extended to the M rows of the row-wise extrapolation matrix and basis rectangles.

The non-limiting example of FIG. 7 may also be used to illustrate the technique described above for the row-wise extrapolation matrix 750. For instance, the values of row #1 (751) of the row-wise extrapolation matrix 750 may be based on the input frequency data in row #1 of all (or at least some) of the basis rectangles 731-735. The values of row #2 (752) of the row-wise extrapolation matrix 750 may be based on the input frequency data in row #2 of all (or at least some) of the basis rectangles 731-735. This relationship may be extended to the M rows of the row-wise extrapolation matrix 750 and basis rectangles 731-735.

Any suitable technique may be used to determine the values of the row-wise extrapolation matrix. As a non-limiting example, the values for a particular row may be based on correlations between the input frequency data of corresponding rows of the basis rectangles. Techniques such as a Burg algorithm, Yule-Walker algorithm. Wiener-Hopf algorithm, linear prediction algorithm, other algorithms and/ or a combination thereof may be used, in some cases At operation 440, the processing circuitry 106 may extrapolate frequency data using the column-wise extrapolation matrix and/or row-wise extrapolation matrix. One or more extrapolation rectangles of a same size as the basis rectangles may be determined. In some embodiments, the extrapolation rectangles may be the same as the basis rectangles, although the scope of embodiments is not limited in this respect. Any suitable group of extrapolation rectangles may be used. As an example, one or more extrapolation rectangles may be selected to be near a particular low fidelity region. As another example, one or more extrapolation rectangles may be selected to surround a particular low fidelity region. It should be noted that embodiments are not limited by these examples.

Multiple examples of techniques and/or operations that may be used as part of extrapolation will be described below. It should be noted that some embodiments may include a combination of one or more of those techniques and/or operations. In addition, in some embodiments, one or more additional techniques and/or operations may be used.

Extrapolation from the extrapolation rectangles in accordance with the column-wise extrapolation matrix and/or row-wise extrapolation matrix may be performed. Extrapolation in an upward or downward direction (such as along a column of the frequency grid) may be performed using the column-wise extrapolation matrix. Extrapolation in a leftward or rightward direction (such as along a row of the frequency grid) may be performed using the row-wise extrapolation matrix.

In some embodiments, one or more operations described below may be performed as part of an extrapolation of the input frequency data of the extrapolation rectangle to replace the input frequency data of a group of low fidelity pixels of the low fidelity regions. For a low fidelity pixel above or below a particular column of the extrapolation rectangle in the frequency grid, a sum of the input frequency data of the particular column of the extrapolation rectangle weighted by a corresponding column of the column-wise extrapolation matrix may be determined. For a low fidelity pixel to the left or to the right of a particular row of the extrapolation rectangle in the frequency grid, a sum of the input frequency data of the particular row of the extrapolation rectangle weighted by a corresponding row of the row-wise extrapolation matrix may be determined.

In some embodiments, one or more operations described below may be performed as part of an extrapolation of the input frequency data of the extrapolation rectangle to replace the input frequency data of a group of low fidelity pixels of the low fidelity regions. For instance, referring to the scenario 800 shown in FIG. 8, in the frequency grid 805, extrapolation from the rectangle 820 may be performed in the upward direction and extrapolation from the rectangle 830 may be performed in the leftward direction. Accordingly, possible frequency values for pixels in the region 810 may be determined based on either or both of the extrapolations from rectangles 820, 830.

For upward or downward extrapolation, the input frequency data of the pixels of the extrapolation rectangle may be extrapolated into a group of rows of pixels immediately above or below the extrapolation rectangle. For instance, between one and M rows may be included in the group when the extrapolation matrix has M rows. The extrapolation may be performed in sequence, with extrapolated rows stored for usage in extrapolation of subsequent rows (either above or below).

For instance, referring to 910 of FIG. 9, when extrapolation is performed in the downward direction 915, the input frequency data of rows 1 through M may be extrapolated into row M+1. The input frequency data of rows 2 through M+1 may be extrapolated into row M+2. This process may continue for rows subsequent to row M+2 (below M+2 in the frequency grid 900, in this case). Referring to 920 of FIG. 9, when extrapolation is performed in the upward direction 925, the input frequency data of rows 1 through M may be extrapolated into row M+1. The input frequency data of rows 2 through M+1 may be extrapolated into row M+2. This process may continue for rows subsequent to row M+2 (above M+2 in the frequency grid 900, in this case).

Extrapolation in the leftward and rightward directions may be performed in an analogous or similar manner, in some embodiments. For leftward or rightward extrapolation, the input frequency data of the pixels of the extrapolation rectangle may be extrapolated into a group of columns of pixels immediately to the left or right of the extrapolation rectangle. For instance, between one and N columns may be included in the group when the extrapolation matrix has N columns. The extrapolation may be performed in sequence, with extrapolated columns stored for usage in extrapolation of subsequent columns (either to the left or right).

Referring to 930 of FIG. 9, when extrapolation is performed in the leftward direction 935, the input frequency data of columns 1 through N may be extrapolated into column N+1. The input frequency data of columns 2 through N+1 may be extrapolated into column N+2. This process may continue for columns subsequent to column N+2 (to the left of N+2 in the frequency grid 900, in this case). Referring to 940 of FIG. 9, when extrapolation is performed in the rightward direction 945, the input frequency data of columns 1 through N may be extrapolated into column N+1. The input frequency data of columns 2 through N+1 may be extrapolated into column N+2. This process may continue for columns subsequent to column N+2 (to the right of N+2 in the frequency grid 900, in this case).

Referring to FIG. 10, a non-limiting example of extrapolation in multiple directions is shown. It should be noted that the order of directions in which the extrapolation is performed is not limited by the example of FIG. 10. An original frequency grid 1005 of input frequency data may include one or more low fidelity regions. An extrapolation in the original grid 1010 in the upward direction may generate the grid 1020. That is, extrapolation of all extrapolation rectangles in the upward direction may be performed. An extrapolation in the original grid 1010 in the downward direction may generate the grid 1025. That is, extrapolation of all extrapolation rectangles in the upward direction may be performed. A weighting of the two grids 1020 and 1025 may be performed to generate a first grid 1030 of coherent, weighted mean values. As an example, for a pixel that is in a location of the original grid 1010 for which the upward and downward extrapolations produce an extrapolated result, a weighting such as those previously described (such as based on distances) may be used for the generation of the grid 1030. In a similar manner, extrapolations of the grid 1030 may be performed in the leftward and rightward directions to generate the grids 1040 and 1045. A weighting similar to that used for the grid 1030 may also be used to generate a second grid 1050 of coherent, weighted mean values. It should be noted that the input frequency data in the high fidelity regions may not necessarily be replaced in the grid 1030 and/or grid 1050.

It should also be noted that embodiments are not limited to performance of the extrapolations and/or weightings in the order shown. As an example, extrapolation in the leftward and rightward directions may be performed, followed by a weighting, followed by extrapolations in the upward and downward directions, followed by another weighting. As another example, one or more extrapolations and/or weightings may be performed in any order. For instance, extrapolations of leftward, upward, rightward, downward may be performed in sequence, followed by a weighting.

In some embodiments, one or more operations described below may be performed as part of an extrapolation of the input frequency data of the extrapolation rectangle to replace the input frequency data of a group of low fidelity pixels of the low fidelity regions. For each extrapolation rectangle, the input frequency data of the extrapolation rectangle may be extrapolated in one or more candidate directions with respect to the extrapolation rectangle, the candidate directions from a group that includes above, below, to the left, and to the right. For a pixel in which extrapolation in multiple candidate directions is performed, the input frequency data of the pixel may be replaced with a value based on a weighted sum of extrapolated values from the multiple extrapolations. In some cases, for a particular pixel, multiple extrapolations may provide candidate frequency values for the pixel, and a weighted sum may be used. In such cases, weights used for the weighted sum may be based at least partly on distances between the pixel and the extrapolation rectangles from which the pixels are extrapolated.

In some embodiments, multiple directions of extrapolation may be used. As an example, values for the low fidelity region 725 may be extrapolated from rectangle 732 in the leftward direction. In addition, values for the low fidelity region 720 may be extrapolated from rectangle 731 in the upward direction and from rectangle 732 in the leftward direction. When different values for a pixel of a low fidelity region (such as those in the region 720) are determined as a result of multiple extrapolations, the values may be combined in accordance with a suitable weighting. For instance, the weighting may be based on distances from the pixel to the extrapolation rectangles from which the multiples extrapolations were performed. In the example of FIG. 7, rectangle 731 is closer to the region 720 than is rectangle 732. Therefore the weighting may be higher for the extrapolation from rectangle 731 than for the extrapolation from rectangle 732, in some cases.

Referring to the scenario 800 shown in FIG. 8, in the frequency grid 805, extrapolation from the rectangle 820 may be performed in the upward direction and extrapolation from the rectangle 830 may be performed in the leftward direction. Accordingly, possible frequency values for pixels in the region 810 may be determined based on either or both of the extrapolations from rectangles 820, 830. As an example, for the pixel 815 of the region 810, a weighting of extrapolations from rectangles 820 and 830 may be based on distances between the pixel 815 and the rectangles 820 and 830. A first distance 825 between the pixel 815 and the rectangle 820 and a second distance 835 between the pixel 815 and the rectangle 830 may be used, in some cases. For instance, denote the first distance 825 as d1, the extrapolated frequency value from rectangle 820 for pixel 815 as V1, the second distance 835 as d2, and the extrapolated frequency value from rectangle 830 for pixel 815 as V2. A combined extrapolated frequency value of V=V1*d2/(d1+d2)+V2*d1/(d1+d2) may be used for the pixel 815. In some cases, it may be possible that extrapolations from more than two rectangles may be combined to determine a value for a particular pixel, in which case the above technique may be extended. It should be noted that embodiments are not limited to this particular combining operation described above for FIG. 8, as other suitable techniques for combining two or more extrapolated values may be used in some embodiments.

Returning to the method 400, at operation 445, the processing circuitry 106 may replace the input frequency data of low fidelity regions/pixels with corresponding extrapolated frequency data (such as that described above). At operation 450, the processing circuitry 106 may refrain from replacement of the input frequency data of high fidelity regions/pixels with corresponding extrapolated frequency data. In some embodiments, one or more of operations 440, 445 and/or 450 may be used to generate output frequency data based on the input frequency data of the high fidelity regions and further based on the extrapolated frequency data of the low fidelity regions. That is, the output frequency data may include and/or retain the input frequency data in the high fidelity regions, but may replace the input frequency data of the low fidelity regions with extrapolated frequency data, in some embodiments.

As an example, it may be convenient or efficient to perform operations such as extrapolation in accordance with a regular pattern, such as in straight rows, straight columns, rectangular regions or other. After the extrapolation, the input frequency data of regions/pixels of low fidelity may be replaced by extrapolated frequency data and the input frequency data of regions/pixels of high fidelity may be retained. For instance, an extrapolation above a rectangle may be performed in a region that is the same size as the rectangle itself, although the region may include high fidelity and low fidelity pixels. After the extrapolation, the frequency data processor may replace the input frequency data of the low fidelity pixels and may refrain from replacement of the input frequency data of the high fidelity pixels.

At operation 455, an inverse Fourier transform may be performed to generate an output compressed image. The inverse Fourier transform may be performed on a set of output frequency data that includes the original input frequency data in high fidelity regions and includes extrapolated frequency data in the low fidelity regions.

At operation 460, a parameter or other information, such as a physical parameter of an environment, may be determined. The output frequency data and/or the output compressed image of operation 455 may be used for such purposes. Examples of physical parameters may include, but are not limited to, speed, position, size and/or type of an object in the environment into which the pulsed transmissions are performed. Additional examples may include, but are not limited to, topology, atmospheric pressure, atmospheric aspects and/or other parameters related to the physical environment. Radar techniques, sonar techniques and/or other techniques may be used, in some embodiments.

It should be noted that, in some embodiments, the parameter of operation 460 may be determined by the frequency data processor and/or the device 100. In some embodiments, the parameter may be determined by another component, in which case the output frequency data, extrapolated frequency data, output compressed image (based at least partly on the extrapolated frequency data) and/or other information may be sent to the other component. As an example, the frequency data processor may be included in a chain of components of the device 100, and the output may be passed to a next component in the chain for further processing. The next component and/or other component in the chain may determine the parameter, in some embodiments.

In Example 1, a frequency data extrapolator may comprise memory, such as main memory 108, static memory 109, and/or the storage device of FIG. 1. The frequency data extrapolator may further comprise processing circuitry, such as processing circuitry 106 of FIG. 1. The processing circuitry may be configured to receive input frequency data mapped to a two-dimensional frequency grid. The input frequency data may be based on return signals received at a sensor, such as sensor 102 of FIG. 1, in response to pulsed transmissions of the sensor in a physical environment. The processing circuitry may be further configured to classify regions of the frequency grid as high fidelity or low fidelity based at least partly on fidelity measurements of the input frequency data. The processing circuitry may be further configured to determine a group of basis rectangles within the high fidelity regions. The processing circuitry may be further configured to determine a column-wise extrapolation matrix and a row-wise extrapolation matrix based on the input frequency data of the basis rectangles. The processing circuitry may be further configured to generate output frequency data for usage in determination of a parameter of the physical environment. The output frequency data may be generated based on a two-dimensional extrapolation of the input frequency data of the high fidelity regions to replace the input frequency data of the low fidelity regions. The extrapolation may be in accordance with the column-wise extrapolation matrix and a row-wise extrapolation matrix.

In Example 2, which extends the subject matter of Example 1, columns of the column-wise extrapolation matrix may be determined per column based on the input frequency data of corresponding columns of the basis rectangles. Rows of the row-wise extrapolation matrix may be determined per row based on the input frequency data of corresponding rows of the basis rectangles.

In Example 3, based on the subject matter of one or any combination of Examples 1-2, the output frequency data may be generated for usage in determination of a parameter of the physical environment by a component external to the frequency data extrapolator.

In Example 4, based on the subject matter of one or any combination of Examples 1-3, the group of basis rectangles may be restricted to a group of non-overlapping rectangles of a same basis rectangle size. The group of basis rectangles may be determined in accordance with a joint maximization of a basis rectangle area and a portion of the high fidelity regions covered by the basis rectangles.

In Example 5, based on the subject matter of one or any combination of Examples 1-4, the processing circuitry may be further configured to generate multiple candidate groups of non-overlapping basis rectangles for which basis rectangle sizes per candidate group are variable. The processing circuitry may be further configured to select a first portion of the candidate groups for which total areas covered by the basis rectangles of the candidate groups are greater than a predetermined coverage threshold. The processing circuitry may be further configured to select the group of basis rectangles as a candidate group from the first portion with a maximum basis rectangle area.

In Example 6, based on the subject matter of one or any combination of Examples 1-5, the processing circuitry may be further configured to determine an extrapolation rectangle within the high fidelity regions. The processing circuitry may be further configured to, as part of an extrapolation of the input frequency data of the extrapolation rectangle to replace the input frequency data of a group of low fidelity pixels of the low fidelity regions: when at least a first low fidelity pixel is above or below a particular column of the extrapolation rectangle in the frequency grid, determine a sum of the input frequency data of the particular column of the extrapolation rectangle weighted by a corresponding column of the column-wise extrapolation matrix; and when at least a second low fidelity pixel is to the left or to the right of a particular row of the extrapolation rectangle in the frequency grid, determine a sum of the input frequency data of the particular row of the extrapolation rectangle weighted by a corresponding row of the row-wise extrapolation matrix.

In Example 7, based on the subject matter of one or any combination of Examples 1-6, the processing circuitry may be further configured to determine a group of extrapolation rectangles within the high fidelity regions. A size of the extrapolation rectangles may be equal to a size of the basis rectangles. The processing circuitry may be further configured to, for each extrapolation rectangle, extrapolate the input frequency data of the extrapolation rectangle in one or more candidate directions with respect to the extrapolation rectangle. The candidate directions may be from a group that includes above, below, to the left, and to the right. The processing circuitry may be further configured to, for each extrapolation rectangle, for a pixel in which extrapolation in multiple candidate directions is performed, replace the input frequency data of the pixel with a value based on a weighted sum of extrapolated values from the multiple extrapolations.

In Example 8, based on the subject matter of one or any combination of Examples 1-7, weights used for the weighted sum may be based at least partly on distances between the pixels in which the extrapolation is performed and the extrapolation rectangles from which the pixels are extrapolated.

In Example 9, based on the subject matter of one or any combination of Examples 1-8, the group of extrapolation rectangles may be equivalent to the group of basis rectangles.

In Example 10, based on the subject matter of one or any combination of Examples 1-9, the columns of the column-wise extrapolation matrix and the columns of the basis rectangles may be mapped to a group of successive column indexes. The rows of the row-wise extrapolation matrix and the rows of the basis rectangles may be mapped to a group of successive row indexes. For each column index, the column of the column-wise extrapolation matrix mapped to the column index may include a complex set of weights determined in accordance with a forward error criterion and a backward error criterion for the input frequency data mapped to columns of the basis rectangles for that are mapped to the column index. For each row index, the row of the row-wise extrapolation matrix mapped to the row index may include a complex set of weights determined in accordance with a forward error criterion and a backward error criterion for the input frequency data mapped to rows of the basis rectangles that are mapped to the row index.

In Example 11, based on the subject matter of one or any combination of Examples 1-10, the fidelity measurements of the input frequency data may include amplitude measurements of the input frequency data. The regions may be classified as high fidelity or low fidelity based at least partly on comparisons of the amplitude measurements with a predetermined amplitude threshold.

In Example 12, based on the subject matter of one or any combination of Examples 1-11, the processing circuitry may be further configured to generate, for usage in the determination of the parameter of the physical environment, an output compressed image based on an inverse Fourier transform of the output frequency data.

In Example 13, based on the subject matter of one or any combination of Examples 1-12, the input frequency data may be mapped to the frequency grid in a dispersed Fourier format that is based on a two-dimensional Fourier transform of two-dimensional compressed image data from the sensor. Each column of the compressed image data may be based on a return signal from one of the pulsed transmissions of the sensor.

In Example 14, based on the subject matter of one or any combination of Examples 1-13, the frequency data extrapolator may be included in a radar device that includes the coherently pulsed sensor, and the return signals include radar returns.

In Example 15, a method of two-dimensional frequency data extrapolation may comprise receiving, from a coherently pulsed sensor, input frequency data mapped to pixels of a two-dimensional frequency grid. The method may further comprise dividing, based on fidelity measurements of the input frequency data, the frequency grid into a group of one or more low fidelity regions and a group of high fidelity regions. The regions may include contiguous groups of the pixels. The method may further comprise dividing the high fidelity regions to include a group of non-overlapping basis rectangles of a same basis rectangle size. The method may further comprise determining columns for a column-wise extrapolation matrix based on correlations between the input frequency data of corresponding columns of the basis rectangles and determining rows for a row-wise extrapolation matrix based on correlations between the input frequency data of rows of the basis rectangles. The method may further comprise extrapolating, in accordance with the extrapolation matrixes, the input frequency data of at least a portion of the pixels of the high fidelity region to replace the input frequency data of at least a portion of the pixels in the low fidelity regions.

In Example 16, based on the subject matter of Example 15, the method may further comprise generating multiple candidate groups of non-overlapping basis rectangles. The method may further comprise selecting a first portion of the candidate groups for which a total area covered by the basis rectangles of the candidate groups is greater than a predetermined coverage threshold. The method may further comprise selecting the group of basis rectangles as a candidate group from the first portion with a maximum basis rectangle area. A same rectangle size may be used for basis rectangles of each candidate group, different rectangle sizes may be used for at least a portion of the candidate groups, locations of the basis rectangles may be varied between the candidate groups, and numbers of basis rectangles per candidate group may be varied between the candidate groups.

In Example 17, based on the subject matter of one or any combination of Examples 15-16, the method may further comprise determining an extrapolation rectangle that is of a same size as the basis rectangles and is located within the high fidelity regions. The method may further comprise extrapolating the input frequency data of the pixels of the extrapolation rectangle into a group of rows of pixels immediately above or below the extrapolation rectangle. Extrapolated values for columns of a first row that is closest to the extrapolation rectangle may be based on a column-wise sum of the input frequency data of the extrapolation rectangle weighted by corresponding columns of the column-wise extrapolation matrix. Extrapolated values for columns of subsequent rows may be based on column-wise sums, weighted by corresponding columns of the column-wise extrapolation matrix, of matrixes formed by shifting out the input frequency data of the extrapolation rectangle and shifting in extrapolated values of previous rows.

In Example 18, based on the subject matter of one or any combination of Examples 15-17, the method may further comprise extrapolating the input frequency data of the pixels of the extrapolation rectangle into a group of columns of pixels immediately to the left or right of the extrapolation rectangle. Extrapolated values for rows of a first column that is closest to the extrapolation rectangle may be based on a row-wise sum of the input frequency data of the extrapolation rectangle weighted by corresponding rows of the row-wise extrapolation matrix. Extrapolated values for rows of subsequent columns may be based on row-wise sums, weighted by corresponding rows of the row-wise extrapolation matrix, of matrixes formed by shifting out the input frequency data of the extrapolation rectangle and shifting in extrapolated values of previous columns.

In Example 19, based on the subject matter of one or any combination of Examples 15-18, the method may further comprise replacing the input frequency data of pixels in the low fidelity regions with the extrapolated frequency data of corresponding pixels. The method may further comprise refraining from replacing the input frequency data of pixels in the high fidelity regions with the extrapolated frequency data of corresponding pixels.

In Example 20, based on the subject matter of one or any combination of Examples 15-19, the method may further comprise generating output frequency data based on the input frequency data of the high fidelity regions and further based on the extrapolated frequency data of the low fidelity regions. The input frequency data may be based on return signals received at the sensor in response to pulsed transmissions of the sensor in a physical environment. The output frequency data may be generated for usage in a determination of a parameter of the physical environment.

In Example 21, a device may comprise a coherently pulsed sensor. The sensor may be configured to transmit pulses during transmission periods. The sensor may be further configured to determine, for usage by processing circuitry, input frequency data for a frequency grid based on return signals received during collection windows for the transmission periods. The device may further comprise the processing circuitry. The processing circuitry may be configured to determine a group of basis rectangles within a group of high fidelity regions of the frequency grid. The processing circuitry may be further configured to determine, for a two-dimensional extrapolation of the input frequency data of the high fidelity regions to replace the input frequency data of a group of low fidelity regions of the frequency grid, a column-wise extrapolation matrix and a row-wise extrapolation matrix. Columns of the column-wise extrapolation matrix may be determined per column based on the input frequency data of corresponding columns of the basis rectangles. Rows of the row-wise extrapolation matrix may be determined per row based on the input frequency data of corresponding rows of the basis rectangles.

In Example 22, based on the subject matter of Example 21, the group of basis rectangles may be restricted to a group of non-overlapping rectangles of a same basis rectangle size.

The group of basis rectangles may be determined in accordance with a joint maximization of a basis rectangle area and a portion of the high fidelity regions covered by the basis rectangles.

In Example 23, based on the subject matter of one or any combination of Examples 21-22, the processing circuitry may be further configured to determine an extrapolation rectangle within the high fidelity regions. The processing circuitry may be further configured to, as part of an extrapolation of the input frequency data of the extrapolation rectangle to replace the input frequency data of a group of low fidelity pixels of the low fidelity regions: when at least a first low fidelity pixel is above or below a particular column of the extrapolation rectangle in the frequency grid, determine a sum of the input frequency data of the particular column of the extrapolation rectangle weighted by a corresponding column of the column-wise extrapolation matrix; and when at least a second low fidelity pixel is to the left or to the right of a particular row of the extrapolation rectangle in the frequency grid, determine a sum of the input frequency data of the particular row of the extrapolation rectangle weighted by a corresponding row of the row-wise extrapolation matrix.

In Example 24, based on the subject matter of one or any combination of Examples 21-23, the device may be a radar device. The transmitted pulses and the return signals may be electromagnetic signals. The processing circuitry may be further configured to determine an output compressed image based on an inverse Fourier transform on extrapolated frequency data for the frequency grid. The processing circuitry may be further configured to determine, based at least partly on the output compressed image, a physical characteristic of an object in a physical environment into which the pulses are transmitted. The extrapolated frequency data may include the input frequency data of the high fidelity regions and further includes replaced frequency data for the low fidelity regions.

In Example 25, based on the subject matter of one or any combination of Examples 21-24, the device may be a sonar device. The transmitted pulses and the return signals may be based on sound waves. The processing circuitry may be further configured to determine an output compressed image based on an inverse Fourier transform on extrapolated frequency data for the frequency grid. The processing circuitry may be further configured to determine, based at least partly on the output compressed image, a physical characteristic of an object in a physical environment into which the pulses are transmitted. The extrapolated frequency data may include the input frequency data of the high fidelity regions and further includes replaced frequency data for the low fidelity regions.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A frequency data extrapolator, comprising:
   memory; and
   processing circuitry, configured to:
   receive input frequency data mapped to a two-dimensional frequency grid, the input frequency data based on return signals received at a sensor in response to pulsed transmissions of the sensor in a physical environment;
   classify regions of the frequency grid as high fidelity or low fidelity based at least partly on fidelity measurements of the input frequency data;
   determine a group of basis rectangles within the high fidelity regions;
   determine a column-wise extrapolation matrix and a row-wise extrapolation matrix based on the input frequency data of the basis rectangles;
   generate a two-dimensional extrapolation of the input frequency data of the high fidelity regions to replace the input frequency data of the low fidelity regions, based on the column-wise extrapolation matrix and the row-wise extrapolation matrix; and
   generate output frequency data for usage in determination of a parameter of the physical environment, based on the two-dimensional extrapolation.

2. The frequency data extrapolator according to claim 1, wherein:
   columns of the column-wise extrapolation matrix are determined per column based on the input frequency data of corresponding columns of the basis rectangles, and
   rows of the row-wise extrapolation matrix are determined per row based on the input frequency data of corresponding rows of the basis rectangles.

3. The frequency data extrapolator according to claim 1, wherein:
   the group of basis rectangles is restricted to a group of non-overlapping rectangles of a same basis rectangle size, and
   the group of basis rectangles is determined in accordance with a joint maximization of a basis rectangle area and a portion of the high fidelity regions covered by the basis rectangles.

4. The frequency data extrapolator according to claim 3, the processing circuitry further configured to:
   generate multiple candidate groups of non-overlapping basis rectangles for which basis rectangle sizes per candidate group are variable;
   select a first portion of the candidate groups for which total areas covered by the basis rectangles of the candidate groups are greater than a predetermined coverage threshold; and
   select the group of basis rectangles as a candidate group from the first portion with a maximum basis rectangle area.

5. The frequency data extrapolator according to claim 1, the processing circuitry further configured to:
   determine an extrapolation rectangle within the high fidelity regions; and
   as part of an extrapolation of the input frequency data of the extrapolation rectangle to replace the input frequency data of a group of low fidelity pixels of the low fidelity regions:
   when at least a first low fidelity pixel is above or below a particular column of the extrapolation rectangle in the frequency grid, determine a sum of the input frequency data of the particular column of the extrapolation rectangle weighted by a corresponding column of the column-wise extrapolation matrix, and
   when at least a second low fidelity pixel is to the left or to the right of a particular row of the extrapolation rectangle in the frequency grid, determine a sum of the input frequency data of the particular row of the extrapolation rectangle weighted by a corresponding row of the row-wise extrapolation matrix.

6. The frequency data extrapolator according to claim 1, the processing circuitry further configured to:
determine a group of extrapolation rectangles within the high fidelity regions, wherein a size of the extrapolation rectangles is equal to a size of the basis rectangles;
for each extrapolation rectangle:
extrapolate the input frequency data of the extrapolation rectangle in one or more candidate directions with respect to the extrapolation rectangle, the candidate directions from a group that includes above, below, to the left, and to the right;
for a pixel in which extrapolation in multiple candidate directions is performed, replace the input frequency data of the pixel with a value based on a weighted sum of extrapolated values from the multiple extrapolations.

7. The frequency data extrapolator according to claim 6, wherein weights used for the weighted sum are based at least partly on distances between the pixels in which the extrapolation is performed and the extrapolation rectangles from which the pixels are extrapolated.

8. The frequency data extrapolator according to claim 6, wherein the group of extrapolation rectangles is equivalent to the group of basis rectangles.

9. The frequency data extrapolator according to claim 1, wherein:
columns of the column-wise extrapolation matrix and columns of the basis rectangles are mapped to a group of successive column indexes,
rows of the row-wise extrapolation matrix and rows of the basis rectangles are mapped to a group of successive row indexes,
for each column index:
the column of the column-wise extrapolation matrix mapped to the column index includes a complex set of weights determined in accordance with a forward error criterion and a backward error criterion for the input frequency data mapped to columns of the basis rectangles for that are mapped to the column index,
for each row index:
the row of the row-wise extrapolation matrix mapped to the row index includes a complex set of weights determined in accordance with a forward error criterion and a backward error criterion for the input frequency data mapped to rows of the basis rectangles that are mapped to the row index.

10. The frequency data extrapolator according to claim 1, wherein:
the fidelity measurements of the input frequency data include amplitude measurements of the input frequency data, and
the regions are classified as high fidelity or low fidelity based at least partly on comparisons of the amplitude measurements with a predetermined amplitude threshold.

11. The frequency data extrapolator according to claim 1, the processing circuitry further configured to:
generate, for usage in the determination of the parameter of the physical environment, an output compressed image based on an inverse Fourier transform of the output frequency data.

12. The frequency data extrapolator according to claim 1, wherein:
the input frequency data is mapped to the frequency grid in a dispersed Fourier format that is based on a two-dimensional Fourier transform of two-dimensional compressed image data from the sensor, and
each column of the compressed image data is based on a return signal from one of the pulsed transmissions of the sensor.

13. A method of two-dimensional frequency data extrapolation, the method comprising:
receiving, from a coherently pulsed sensor, input frequency data mapped to pixels of a two-dimensional frequency grid;
dividing, based on fidelity measurements of the input frequency data, the frequency grid into a group of one or more low fidelity regions and a group of high fidelity regions, wherein the regions include contiguous groups of the pixels;
dividing the high fidelity regions to include a group of non-overlapping basis rectangles of a same basis rectangle size;
determining columns for a column-wise extrapolation matrix based on correlations between the input frequency data of corresponding columns of the basis rectangles and determining rows for a row-wise extrapolation matrix based on correlations between the input frequency data of rows of the basis rectangles; and
extrapolating, in accordance with the extrapolation matrixes, the input frequency data of at least a portion of the pixels of the high fidelity region to replace the input frequency data of at least a portion of the pixels in the low fidelity regions.

14. The method according to claim 13, the method further comprising:
generating multiple candidate groups of non-overlapping basis rectangles,
selecting a first portion of the candidate groups for which a total area covered by the basis rectangles of the candidate groups is greater than a predetermined coverage threshold; and
selecting the group of basis rectangles as a candidate group from the first portion with a maximum basis rectangle area,
wherein a same rectangle size is used for basis rectangles of each candidate group, different rectangle sizes are used for at least a portion of the candidate groups, locations of the basis rectangles are varied between the candidate groups, and numbers of basis rectangles per candidate group is varied between the candidate groups.

15. The method according to claim 13, the method further comprising:
determining an extrapolation rectangle that is of a same size as the basis rectangles and is located within the high fidelity regions; and
extrapolating the input frequency data of the pixels of the extrapolation rectangle into a group of rows of pixels immediately above or below the extrapolation rectangle,
wherein extrapolated values for columns of a first row that is closest to the extrapolation rectangle is based on a column-wise sum of the input frequency data of the extrapolation rectangle weighted by corresponding columns of the column-wise extrapolation matrix, and
wherein extrapolated values for columns of subsequent rows are based on column-wise sums, weighted by corresponding columns of the column-wise extrapolation matrix, of matrixes formed by shifting out the input frequency data of the extrapolation rectangle and shifting in extrapolated values of previous rows.

16. The method according to claim 15, the method further comprising:
extrapolating the input frequency data of the pixels of the extrapolation rectangle into a group of columns of pixels immediately to the left or right of the extrapolation rectangle,
wherein extrapolated values for rows of a first column that is closest to the extrapolation rectangle is based on a row-wise sum of the input frequency data of the extrapolation rectangle weighted by corresponding rows of the row-wise extrapolation matrix, and
wherein extrapolated values for rows of subsequent columns are based on row-wise sums, weighted by corresponding rows of the row-wise extrapolation matrix, of matrixes formed by shifting out the input frequency data of the extrapolation rectangle and shifting in extrapolated values of previous columns.

17. The method according to claim 13, the method further comprising:
replacing the input frequency data of pixels in the low fidelity regions with the extrapolated frequency data of corresponding pixels; and
refraining from replacing the input frequency data of pixels in the high fidelity regions with the extrapolated frequency data of corresponding pixels.

18. The method according to claim 13, the method further comprising:
generating output frequency data based on the input frequency data of the high fidelity regions and further based on the extrapolated frequency data of the low fidelity regions,
wherein the input frequency data is based on return signals received at the sensor in response to pulsed transmissions of the sensor in a physical environment, and
wherein the output frequency data is generated for usage in a determination of a parameter of the physical environment.

19. A device, comprising:
a coherently pulsed sensor, configured to:
transmit pulses during transmission periods; and
determine, for usage by processing circuitry, input frequency data for a frequency grid based on return signals received during collection windows for the transmission periods, and
the processing circuitry, configured to:
determine a group of basis rectangles within a group of high fidelity regions of the frequency grid;
determine, for a two-dimensional extrapolation of the input frequency data of the high fidelity regions to replace the input frequency data of a group of low fidelity regions of the frequency grid, a column-wise extrapolation matrix and a row-wise extrapolation matrix,
wherein columns of the column-wise extrapolation matrix are determined per column based on the input frequency data of corresponding columns of the basis rectangles, and
wherein rows of the row-wise extrapolation matrix are determined per row based on the input frequency data of corresponding rows of the basis rectangles.

20. The device according to claim 19, wherein:
the group of basis rectangles is restricted to a group of non-overlapping rectangles of a same basis rectangle size, and
the group of basis rectangles is determined in accordance with a joint maximization of a basis rectangle area and a portion of the high fidelity regions covered by the basis rectangles.

21. The device according to claim 19, the processing circuitry further configured to:
determine an extrapolation rectangle within the high fidelity regions; and
as part of an extrapolation of the input frequency data of the extrapolation rectangle to replace the input frequency data of a group of low fidelity pixels of the low fidelity regions:
when at least a first low fidelity pixel is above or below a particular column of the extrapolation rectangle in the frequency grid, determine a sum of the input frequency data of the particular column of the extrapolation rectangle weighted by a corresponding column of the column-wise extrapolation matrix, and
when at least a second low fidelity pixel is to the left or to the right of a particular row of the extrapolation rectangle in the frequency grid, determine a sum of the input frequency data of the particular row of the extrapolation rectangle weighted by a corresponding row of the row-wise extrapolation matrix.

22. The device according to claim 19, wherein:
the device is a radar device,
the transmitted pulses and the return signals are electromagnetic signals,
the processing circuitry is further configured to:
determine an output compressed image based on an inverse Fourier transform on extrapolated frequency data for the frequency grid; and
determine, based at least partly on the output compressed image, a physical characteristic of an object in a physical environment into which the pulses are transmitted,
wherein the extrapolated frequency data includes the input frequency data of the high fidelity regions and further includes replaced frequency data for the low fidelity regions.

23. The device according to claim 19, wherein:
the device is a sonar device,
the transmitted pulses and the return signals are based on sound waves,
the processing circuitry is further configured to:
determine an output compressed image based on an inverse Fourier transform on extrapolated frequency data for the frequency grid; and
determine, based at least partly on the output compressed image, a physical characteristic of an object in a physical environment into which the pulses are transmitted,
wherein the extrapolated frequency data includes the input frequency data of the high fidelity regions and further includes replaced frequency data for the low fidelity regions.

* * * * *

UNITED STATES PATENT AND TRADEMARK OFFICE
CERTIFICATE OF CORRECTION

PATENT NO. : 10,121,224 B2  
APPLICATION NO. : 15/222002  
DATED : November 6, 2018  
INVENTOR(S) : Harbaugh et al.

Page 1 of 1

It is certified that error appears in the above-identified patent and that said Letters Patent is hereby corrected as shown below:

In the Specification

In Column 1, Line 48, delete "embodiments:" and insert --embodiments;-- therefor In Column 5, Line 15, delete "(EPROM)." and insert --(EPROM),-- therefor In Column 5, Line 38, delete "Wi-Fi®." and insert --Wi-Fi®,-- therefor In Column 5, Line 39, delete "WiMax®)." and insert --WiMax®),-- therefor In Column 9, Line 25, delete "signal" and insert --signal,-- therefor In Column 9, Line 61, delete "level" and insert --level,-- therefor (1st occurrence)

In Column 12, Line 29, delete "algorithm." and insert --algorithm,-- therefor

In Column 12, Line 30, delete "algorithm" and insert --algorithm,-- therefor

In Column 13, Line 10, delete "algorithm." and insert --algorithm,-- therefor

In Column 13, Line 12, delete "cases" and insert --cases.-- therefor

In the Claims

In Column 22, Line 6, in Claim 1, delete "data:" and insert --data;-- therefor

In Column 24, Line 10, in Claim 13, delete "grid:" and insert--grid;-- therefor

Signed and Sealed this  
Twenty-fourth Day of March, 2020

Andrei Iancu  
*Director of the United States Patent and Trademark Office*